United States Patent Office 3,161,454
Patented Dec. 15, 1964

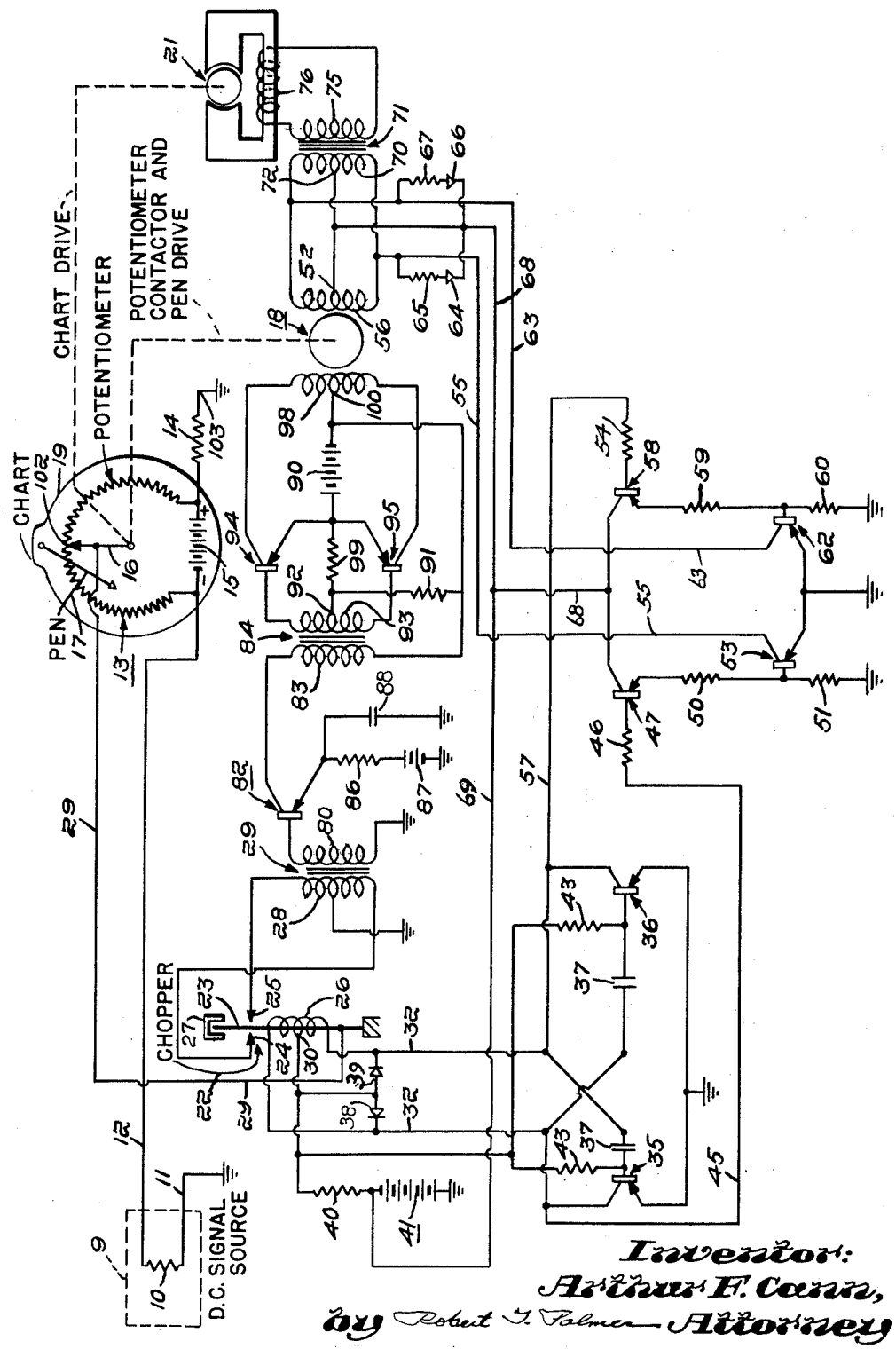

3,161,454
CONTROL CIRCUITS FOR ELECTRIC MOTORS
Arthur F. Cann, Winchester, Mass., assignor to Stevens-Arnold Inc., South Boston, Mass., a corporation of Massachusetts
Filed Jan. 14, 1963, Ser. No. 251,368
4 Claims. (Cl. 346—32)

This invention relates to controls responsive to small D.C. signals, for adjusting electric motors.

Potentiometer systems of the type disclosed in the U.S. Patent No. 2,423,540, have electric motors, choppers and amplifiers energized by 60 cycle A.C. The D.C. input signals are small, and the lines which carry such signals are within A.C. fields so that A.C. is often superimposed on the D.C. signals, causing inaccurate operation of the potentiometers.

This invention energizes all of the components of such a system with D.C., and while the chopper of the system converts the D.C. signal to A.C. for amplification, the frequency of the converted signal is different from line frequency. In one embodiment of this invention, a battery-operated, transistor-driven chopper has a reed that is driven at a frequency of 94 c.p.s. between contacts connected to an input transformer of a transistor amplifier, the reed being connected to the D.C. signal source and to a potentiometer across which is connected a constant voltage reference source, the difference signal being converted to A.C. in the input transformer, amplified and applied to the control winding of the electric motor which drives the contactor of the potentiometer, and the pen of the associated chart. The 94 c.p.s. signal from the driver of the chopper is amplified and supplied to the power or reference winding of that motor, and is supplied through a transformer to the stator winding of a synchronous motor which drives the chart of the potentiometer.

An object of this invention is to prevent the A.C. fields of power lines from affecting the responses to signals from D.C. control sources.

Another object of this invention is to operate the chopper and electric motors of a potentiometer system at a frequency different from power line frequency.

Another object of this invention is to energize a potentiometer system with D.C.

This invention will now be described with reference to the annexed drawing which is a diagrammatic view of a potentiometer system embodying this invention.

A D.C. signal source 9 which may be a thermistor 10 having a positive temperature coefficient of resistance, has a grounded output lead 11, and has another output lead 12 connected to one end of potentiometer 13, the other end of which is connected through a resistor 14 to ground. A constant voltage, reference battery 15 is connected to the ends of the potentiometer. The potentiometer has a rotary contactor 16, and a pen 17 both driven by an electric motor 18. A chart 19 for the pen 17 is driven by a synchronous motor 21. The thermistor 10 responds to heat from a source which is not shown, and causes the pen 17 to record the temperature of the heat source on the chart 19.

A chopper 22 has a cantilever supported reed 23 of magnetic spring metal, with its free end between contacts 24 and 25. A permanent magnet 27 opposite the free end of the reed magnetizes the latter so that it can be vibrated at the frequency of current supplied to an electromagnetic coil 26 around the reed. The contacts 24 and 25 are connected to the ends of primary winding 28 of amplifier input transformer 29. The winding 28 has a center-tap connected to ground. The reed 23 is connected by wire 29 to the contactor 16. The coil 26 has a center-tap 30.

The components described so far in connection with the drawing are conventional and are found in said patent, except for the coil 26 having a center-tap, and except for the reed not being driven at line frequency.

The ends of the coil 26 are connected by wires 32 to the collectors of transistors 35 and 36, and through coupling capacitors 37 to the bases of the transistors. Oppositely poled diodes 38 and 39 are connected in series across the coil 26, and their junction is connected to center-tap 30 of the coil, which center-tap is also connected through resistor 40 to the negative terminal of a battery 41, the positive terminal of which is grounded. The center-tap 30 is also connected through resistors 43 to the bases of the transistors 35 and 36. The emitters of the transistors are connected to ground. The circuit including the center-tapped coil 26 is a free running multivibrator. The two halves of such a circuit are never in perfect balance. An increase in the collector current of the transistor 35 reduces its collector voltage and the voltage in the capacitor 37 connected to the base of the transistor 36. This, in turn, reduces the collector current of the transistor 36 and increases its collector voltage. A higher voltage is therefore applied through the capacitor 37 which is connected to the base of the transistor 35, further increasing its collector current. This process is cumulative, and the collector current 36 dies down almost to zero, while the collector current of the transistor 35 builds up to a final value. The capacitor 37 which is connected to the base of the transistor 36 loses its charge through the half of the coil 26 which is connected to the base of the transistor 36, and as soon as the voltage on the base of the transistor 36 becomes more positive than the cut-off voltage, collector current again flows, and the cycle is repeated with the actions of the two transistors interchanged. First one and then the other transistor is cut off, the two transistors acting as switches, supplying D.C. to the reed drive coil 26 in the form of square wave A.C. A.C. appears across the ends of the coil 26 through the action of the two transistors in applying square half-waves oppositely to the two halves of the coil. The voltage at one end of the coil increases while the voltage at the other end of the coil decreases as in a push-pull connected output transformer circuit. The frequency of 94 c.p.s. is sufficiently different from 60 c.p.s. that no 60 c.p.s. field in which the multivibrator may be placed can affect its operation.

The collector of the transistor 35 is connected by wire 45 and resistor 46 to the base of transistor 47. The emitter of the transistor 47 is connected through series-connected resistors 50 and 51 to ground. The junction of the resistors 50 and 51 is connected to the base of transistor 53, the collector of which is connected by wire 55 to one end of power field winding 56 of the motor 18. The emitter of the transistor 53 is grounded. The collector of the transistor 35 is connected by wire 57 and resistor 54 to the base of transistor 58, the emitter of which is connected through series-connected resistors 59 and 60 to ground. The junction of the resistors 59 and 60 is connected to the base of transistor 62, the collector of which is connected by wire 63 to the other end of the field winding 56. The emitter of the transistor 62 is grounded. The collectors of the transistors 47 and 58 are connected together and by wire 68 to center-tap 66 of the winding 56, and by wire 69 to the negative terminal of the battery 41. Oppositely poled diodes 64 and 66 are connected in series with resistors 65 and 67 across the winding 56, and the junction of the diodes 64 and 66 is connected to center-tap 52 of the winding 56.

The transistors 47–58 and 53–62 are pairs of push-pull connected amplifiers which amplify the 94 c.p.s. full waves from the chopper transistors 35 and 36 for supply to the power field winding 56. The transistors 47–59 and 53–62 also isolate the transistors 35 and 36 from the winding 56 so that the latter cannot affect the operation of the chopper.

The ends of the winding 56 are connected to the ends of primary winding 70 of transformer 71. The winding 70 has a center-tap 72 connected to the center-tap 52. Secondary winding 75 of the transformer 71 is connected across stator winding 76, and supplies 94 c.p.s. current to operate the motor 21 as a synchronous motor.

Secondary winding 80 of the input transformer 29 is connected at one end to ground, and at its other end to the base of transistor 82, the collector of which is connected to one end of primary winding 83 of inter-stage transformer 84, and the emitter of which is connected through resistor 86 and bias battery 87 to ground. A by-pass capacitor 88 is shunted across the series connection of the resistor 86 and the battery 87. The other end of the winding 83 is connected to the negative terminal of battery 90, and through the latter and resistor 99 to center-tap 92 of secondary winding 93 of the transformer 84. The ends of the winding 93 are connected to the bases of transistors 94 and 95, the collectors of which are connected to the ends of control field winding 98 of the motor 18, and the emitters of which are connected together and through the resistor 99 to the center-tap 92, and to the positive terminal of the battery 90. The negative terminal of the battery 90 is connected to center-tap 100 of the field winding 98.

The transistor 82 is a single-ended amplifier of the A.C. developed across the secondary winding 80 of the input transformer 29 as a result of the operation of the chopper 22, and the transistors 94 and 95 are push-pull amplifiers of the A.C. output of the transistor 82, and are drivers of the control field winding 98 of the motor 18.

The thermistor 10, the resistor 14 and the potentiometer 13 form a bridge for which the battery 15 supplies a D.C. potential. The contactor 16 divides the potentiometer 13 into two resistances, one between the contactor 16 and one end of the potentiometer, and the other between the contactor and the other end of the potentiometer.

In operation, when the potentials at the point 102 where the contactor 16 touches the potentiometer 13, and at the point 103 where the battery 15 is connected to ground, are equal, the bridge is in balance, and the potential at the center-tap of the input winding 28 is zero so that the operation of the chopper has no effect on the system.

When the temperature of the space where the thermistor 10 is located increases, the resistance of the thermistor increases, causing the potential at the point 103 to become larger than that at the point 102, and the center-tap of the winding 28 to become positive. Due to the operation of the chopper 22, the unbalanced D.C. in the bridge is interrupted causing A.C. to appear across the secondary winding 80, which A.C. is amplified by the transistors 82, 94 and 95, and is applied to the control field winding 98 of the motor 18 in the proper phase relation to the A.C. supplied to its power field winding 56, to cause the rotor of the motor 18 to rotate in the direction to move the contactor 16 along the potentiometer 13 to cause the potentials at the points 102 and 103 to become equal, and the motor 18 to stop. During this movement of the contactor, the pen 17 is moved to record the temperature at the thermistor on the chart 19 which is rotated continuously by the motor 21.

When the temperature at the thermistor 10 decreases, the bridge is unbalanced in the opposite direction, the D.C. potential at the point 102 becoming larger than that at the point 103, causing the center-tap of the winding to become negative. The unbalanced D.C. in the bridge is interrupted by the chopper 22, and changed to A.C. in the secondary winding 80, which A.C. is amplified by the transistors 82, 94 and 95, and is applied to the control field winding 98 of the motor 18 in the proper phase relation with the A.C. supplied to the power field winding 56, to cause the rotor of the motor 18 to rotate in the opposite direction and to move the contactor 16 along the potentiometer 13 to cause the potentials at the points 102 and 103 to become equal, and the motor 18 to stop. The pen 17 is moved when the contactor is moved, for recording the temperature at the thermistor on the chart 19.

By operating the system with batteries, it is portable, is not affected by A.C. power failure, and more important, there are no stray A.C. fields located near the conductors of the weak D.C. control signals. By operating the chopper at 94 c.p.s., its frequency is sufficiently different from power line frequency to prevent stray fields from power lines from affecting its operation.

By using a transistor multivibrator for driving a chopper having a center-tapped energizing winding, and for supplying power to a center-tapped field winding of an associated motor, there is conservation of power since the two chopper transistors act as on-off switches with low power consumption. The saving in power over the usual sine-wave A.C. supply is comparable to the saving in power of a class C transmitter over that of a class A transmitter.

What is claimed is:

1. In a control system for an electric motor having a control field winding and a power field winding, means including a chopper for converting a D.C. control signal to A.C., means for amplifying said A.C., and means for supplying the amplified A.C. to said control field winding the combination of means forming an effective center-tap on said coil, a first transistor having an output electrode connected to one end of said coil, a second transistor having an output electrode connected to the other end of said coil, a coupling capacitor connected to said output electrode of said first transistor and to an input electrode of said second transistor, a second coupling capacitor connected to said output electrode of said second transistor and to an input electrode of said first transistor, resistors connecting said input electrodes to said center-tap, means for connecting said center-tap and another input electrode of each of said transistors to opposite polarity terminals of a D.C. power source, and means including means connected to said output electrodes for supplying A.C. to said power field winding.

2. In a control system including a potentiometer having a rotary contactor, a rotary chart, a pen for recording on said chart, means including a motor for rotating said contactor and for moving said pen, said motor having a control field winding and a power field winding, means including a synchronous motor having a stator winding, for moving said chart, means including a chopper having an energizing coil, for converting a D.C. control signal to A.C. means for amplifying said A.C. and means for supplying the amplified A.C. to said control field winding, the combination of means forming effective center-taps on said coil and said power field winding, a first transistor having an output electrode connected to one end of said coil, a second transistor having an output electrode connected to the other end of said coil, a coupling capacitor connected to said output electrode of said first transistor and to an input electrode of said second transistor, a second coupling capacitor connected to said output electrode of said second transistor end to an input electrode of said first transistor, resistors connecting said input electrodes to said center-tap of said coil, means for connecting said center-tap of said coil and another input electrode of each of said transistors to opposite polarity terminals of a D.C. power source, and means including means connecting said output electrodes to the ends of said power field winding, and said center-tap of said coil to said center-tap of said power field winding for supplying A.C. to said power field winding, and means including means connected to said output electrodes and to said stator winding for supplying full-wave A.C. to said stator winding.

3. The invention claimed in claim 2 in which said last mentioned means includes a transformer having a primary winding with an effective center-tap connected to said center-tap of said power field winding, and with the ends of said power field connected to the ends of said primary winding, said transformer having a secondary winding with its ends connected to the ends of said stator winding.

4. A control system for an electric motor having a power field winding and a control field winding, comprising means forming an effective center-tap for said power field winding, a chopper having an energizing coil, means forming an effective center-tap for said coil, means including said chopper for converting a D.C. control signal to an A.C. signal, means for amplifying said A.C. signal and supplying the amplified A.C. signal to said control field winding, and means including a transistor driven multivibrator connected to the ends of said coil and of said power field winding and to said center-taps for supplying full wave square-wave A.C. to said coil and to said power field winding.

References Cited in the file of this patent
UNITED STATES PATENTS

| | | |
|---|---|---|
| 2,656,498 | Goodwin | Oct. 20, 1953 |
| 2,886,755 | Ehret et al. | May 12, 1959 |
| 2,888,579 | Wanlass | May 26, 1959 |
| 2,915,689 | Popowsky | Dec. 1, 1959 |
| 3,029,336 | Ferrar | Apr. 10, 1962 |
| 3,034,125 | Gonzenbach | May 8, 1962 |
| 3,043,997 | Marshall | July 10, 1962 |
| 3,046,461 | Luppold | July 24, 1962 |
| 3,066,297 | Adams | Nov. 27, 1962 |
| 3,073,164 | Rorden et al. | Jan. 15, 1963 |
| 3,081,423 | Schmoock | Mar. 12, 1963 |
| 3,095,254 | Chope | June 25, 1963 |